No. 757,360. PATENTED APR. 12, 1904.
L. L. STEVENS.
COMBINED POTATO SLICER AND GRATER.
APPLICATION FILED MAR. 17, 1903.
NO MODEL. 2 SHEETS—SHEET 1.
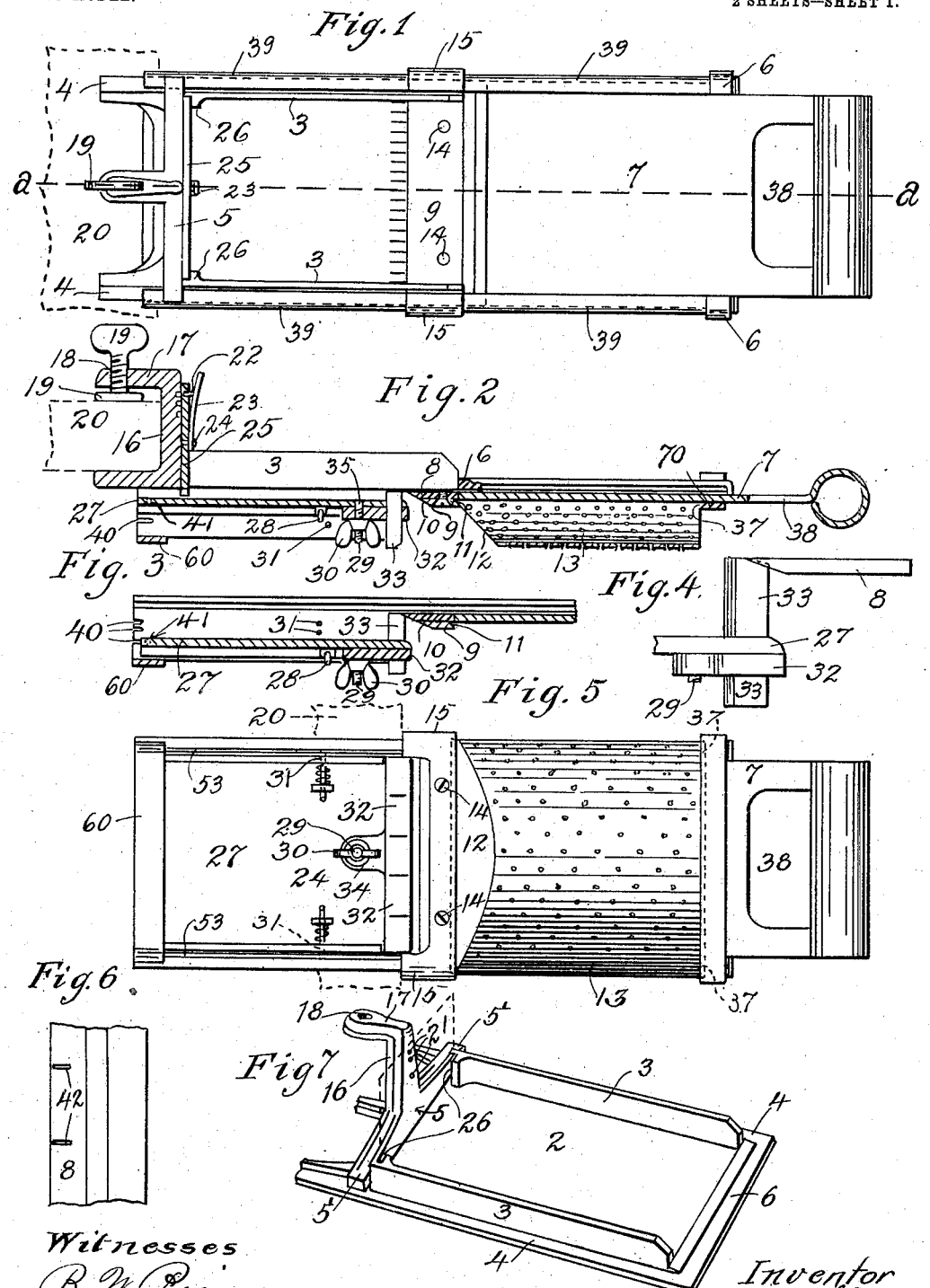
Witnesses
B. W. Purer
H. E. Pratt
Inventor
Lawrence L. Stevens
by James R. Rogers
Attorney.

No. 757,360. PATENTED APR. 12, 1904.
L. L. STEVENS.
COMBINED POTATO SLICER AND GRATER.
APPLICATION FILED MAR. 17, 1903.
NO MODEL. 2 SHEETS—SHEET 2.
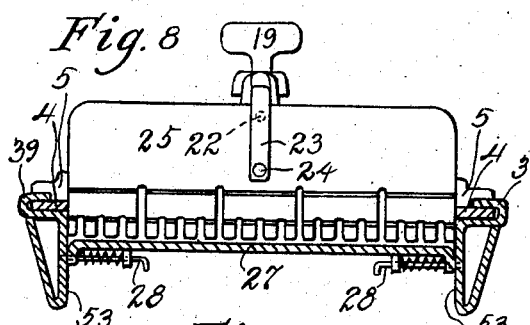
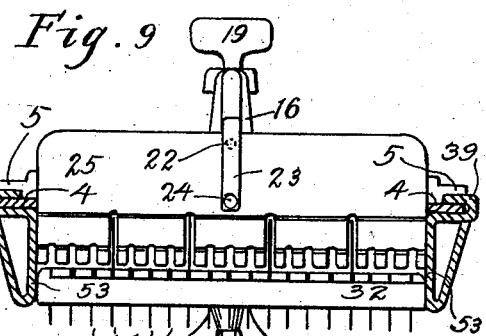
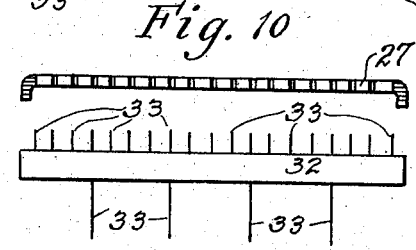
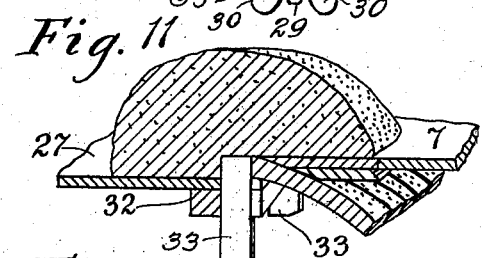
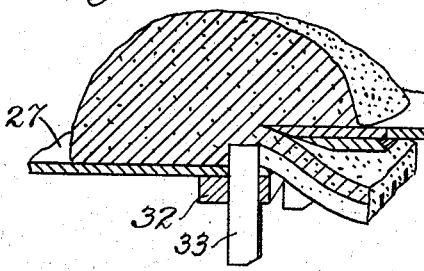
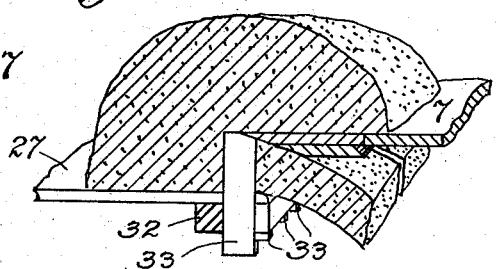
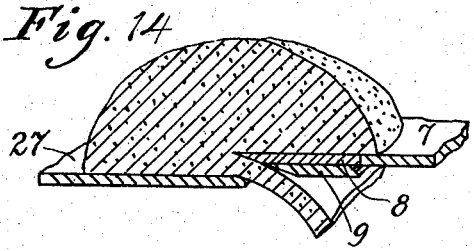
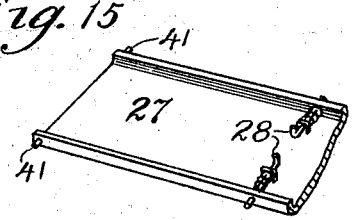
Witnesses
B. N. Pierce
H. E. Pratt
Inventor
Lawrence L. Stevens
by James R. Rogers
Attorney.
THE NORRIS PETERS CO., PHOTO-LITHO., WASHINGTON, D. C.

No. 757,360.         Patented April 12, 1904.

UNITED STATES PATENT OFFICE.

LAWRENCE L. STEVENS, OF LOS ANGELES, CALIFORNIA.

COMBINED POTATO SLICER AND GRATER.

SPECIFICATION forming part of Letters Patent No. 757,360, dated April 12, 1904.

Application filed March 17, 1903. Serial No. 148,236. (No model.)

*To all whom it may concern:*

Be it known that I, LAWRENCE L. STEVENS, a citizen of the United States, residing at Los Angeles, in the county of Los Angeles and State of California, have invented a new and useful Combined Potato Slicer and Grater; and I do hereby declare the following to be a full, clear, and exact description of the invention, such as will enable others skilled in the art to which it appertains to make and use the same.

This invention relates to improvements in a combined potato slicer and grater; and the objects of my improvements are, first, to construct a sliding cutter-plate with a grater on the bottom thereof, the extended edges of which form a brace for the cutter-plate; second, to bring the cutter and knives in close proximity to the support thereof; third, to make a vertically-adjustable stop under quick and ready control of the operator; fourth, to make slicers for potatoes, beets, and other vegetables and fruits more economically than heretofore constructed, and, fifth, to produce a compact culinary machine useful in the treatment of vegetables, fruits, and the like, both of which devices when combined in one machine aid in accomplishing a unitary result. I attain these objects by the construction illustrated in the accompanying drawings, in which—

Figure 1 is a top plan view of the machine opened and extended to its full length, the edge of the table to which the machine is attached shown in dotted lines. Fig. 2 is a longitudinal sectional view of the machine and table illustrated upon Fig. 1, taken on the line *a a*. Fig. 3 is a view, partly in elevation and partly in section, of the cutter-plate and parts of the machine attached thereto and of portions of the cutter-plate and cutter-blade shown in section. Fig. 4 is a view in elevation, on an enlarged scale, of the cutter-plate and cutter-blade carried thereby, the cutter-plate and vertical knives secured thereto. Fig. 5 is a plan view of the under side of the machine extended to its full length, showing the grater in position for use. Fig. 6 is a plan view of a portion of the cutter-blade detached from the sliding cutter-plate, illustrating the grooves in the cutter-blade. Fig. 7 is a view in perspective of the bracket-frame removed from the table or support, the vertical adjustable stop shown in dotted lines. Fig. 8 is a view in elevation of the vertically-adjustable stop, a portion of the bracket-frame, sliding cutter-plate, and parts of the machine attached to the cutter-plate shown in section. Fig. 9 is a similar view of portions of the machine, as is shown upon Fig. 8 of the drawings, with the adjustable cutting-knives shown in elevation. Fig. 10 shows views in elevation of portions of the machine illustrated in detail. Fig. 11 is a view, partly perspective and partly sectional, of parts of the machine with a portion of a potato thereon ready to be cut into what is known to the trade as the "shoestring cut." Fig. 12 is a view, part in perspective and part in section, of parts of the machine, a portion of a potato placed thereon ready to be cut into what is known to the trade as the "fancy cut." Fig. 13 is a view, partly in perspective and partly in section, of parts of the machine, a portion of a potato thereon ready to be cut into what is familiarly known as the "French fry." Fig. 14 is a view, parts in perspective and parts in section, of the machine, a portion of a potato thereon ready to be cut into what is known to the trade as the "plain slice;" and Fig. 15 is a perspective view of a portion of the gage-plate, a part thereof being broken away.

Similar reference-numerals refer to like parts throughout the several views.

The numeral 1 refers to the stationary bracket-frame, preferably rectangular in form, forming a well 2, as shown upon Fig. 7 of the drawings. This frame has two lateral walls 3 3, which extend the entire length of the well 2, and two lateral flanges 4 4, a rear end wall 5, having projections 5' 5', and an end brace 6, under which the cutter-plate 7, carrying the cutter-blade 8, slides, which is secured to the inner end thereof by means of a strip 9, beveled upon its under inner rear edge at 10. The upper front edge of the strip 9 is reversely beveled at 11, which receives the rear extension 12 of the rear end of the grater 13. The strip 9 is secured to the cutter-blade 8 by means of screws 14 14 or other equivalent devices, and the strip 9 has overturned ends or stops 15 15, which extend across the cutter-plate 7 on the under side thereof and lap over the lateral flanges 4 4 of the bracket-frame 1, as shown at 15 15 upon Figs. 1 and 5 of the drawings.

The rear wall 5 of the bracket-plate extends upward, as at 16, and it has a rearward extension 17 with a perforation 18 therein, through which the thumb-pressure screw 19 passes in order to clamp the bracket-frame 1 to the edge of the table 20 or other support. (Shown in dotted lines upon Figs. 1 and 2 of the drawings.) The front face of the vertical portion 16 of the bracket has formed therein perforations 21 21, in which the horizontally-projecting pin 22, riveted to the upper free end of the spring-latch 23, is adapted to be inserted into or removed from the same in order to adjust the sliding stop 25, whereby the said stop is held at the height desired upon the front face of the vertical portion 16 of the bracket.

At the rear end of the lateral walls 3 3, where they join the rear end wall 5, are ways 26 26, in which the stop 25 vertically slides.

A well is formed of the projecting walls 53 53 of the cutter-plate 7, and the brace 60 connects their rear ends. By means of the horizontal slots 40 40, of different depths, in the rear ends of said walls 53 53 the perforations 31 31 at different distances from the ends of said walls 53 53, the pins 41 41 upon the ends of the gage-plate 27, and the hook-ended spring-bolts 28 28, secured thereto, the gage-plate 27 is removably secured within the well of the cutter-plate, and the carrier and vertical knives are longitudinally adjustable in the well.

The hook-ended spring-bolts 28 28, secured to the under face of the gage-plate 27, securely hold the plate 27 in a more or less elevated position, and by inserting the free ends of the bolts into the perforations 31 31, of varying distance from the ends of the lateral walls 53 53 of the cutter-plate 7, the gage-plate supporting the carrier for the vertical knives is horizontally adjusted, as shown upon Figs. 2, 3, 4, and 6 of the drawings.

To the under side of the gage-plate 27, near the front end thereof, I secure a downwardly-projecting screw-threaded bolt 29, which has a thumb-nut 30 that turns thereon in order to clamp the carrier 32 for the vertical cutting-knives 33 to the under side of the gage-plate 27.

The carrier 32 is provided with a rearwardly and centrally extending bracket 34, (shown upon Fig. 5 of the drawings,) having a perforation 35 (shown upon Fig. 2) near its free end through which the screw-bolt 29 is inserted, and by means of the thumb-nut 30 the carrier 32, with the vertical knives 33, is securely clamped to the gage-plate 27.

The carrier 32 for the vertical knives 33 is reversible by unscrewing the thumb-nut 30 from the screw-bolt 29, and either the long knives 33 of the carrier 32 may be employed or the carrier may be removed, reversed, and clamped to the gage-plate 27 when the short knives upon the upper side of the carrier (illustrated upon Figs. 2, 11, and 12) are brought into operation.

The cutter-blade 8 upon its under beveled face, as shown upon Fig. 6, is provided with slots into which the front upper beveled edges of the long vertical knives 33 33 contact, as illustrated upon Figs. 3, 4, and 13, when the cutter-plate 7, carrying the cutter-blade 8, is forced within the bracket-frame 1 to hold the long vertical knives immovably in vertical positions.

The grater 13 is secured to the under side of the cutter-plate 7 by means of a front extension 37, (shown in dotted lines upon Fig. 5 and in full lines upon Fig. 2 of the drawings,) which extension 37 is beveled from front to rear and held in place by means of a reversely-beveled cleat 70, fastened to the under face of the cutter-plate 7. The rear extension 12 of the grater is beveled upon its upper face and is secured in the front beveled edge of the strip 9, hereinbefore referred to, and it is illustrated in full lines upon Fig. 2 and in dotted lines upon Fig. 5 of the drawings.

The cutter-plate 7 is provided with a recess 38, by which the cutter-plate is reciprocated upon the lateral flanges 4 4 of the bracket-frame 1. The perforated sheet of metal forming the grater 13 extends laterally partly on the under side of the cutter-plate, the edges thereof turned over upon itself forming ways 39 39, as shown upon Figs. 1, 8, and 9 of the drawings. These ways 39 39 are rearwardly extended, and the ends thereof are connected by the brace 60. The said ways are deepened and made stronger, as shown upon Figs. 8 and 9 of the drawings, as they are extended rearwardly from the stops 15 15 and form the rearward-extending walls 53 53 of the cutter-plate, between which the gage-plate 27 is adjustable, as hereinbefore mentioned.

The operation of this invention will be readily understood from the foregoing description, taken in connection with the drawings appended hereto.

It is obvious that many variations and changes in the details of construction and arrangement of my invention would readily suggest themselves to persons skilled in the art and still be within the spirit and scope of my invention.

Having described my invention, what I claim, and desire to secure by Letters Patent, is—

1. A potato-slicer comprising a bracket-frame having lateral extending flanges, lateral walls, an end brace and a rear end wall made integrally a part of the frame, the said rear end wall provided with projections, a cutter-plate, a cutter-blade, a strip for securing the cutter-blade to the cutter-plate and having overturned ends or stops, the said overturned ends or stops adapted to abut against the said projections, the said cutter-plate provided with rearwardly-projecting walls and a brace connecting the rear ends thereof, a gage-plate, means for vertically and longitudinally adjusting the gage-plate within the rearwardly-projecting walls of the cutter-plate, a carrier, vertical knives and devices for removably fastening the carrier to the gage-plate.

2. In a potato-slicer, a bracket-frame having lateral flanges, lateral walls, an end brace and a rear wall, the said rear wall provided with projections extending outside the said lateral walls, in combination with a cutter-plate, a cutter-blade secured to the cutter-plate, provided with slots on the under beveled face thereof, a strip having overturned ends or stops fastened to the cutter-plate, an adjustable gage-plate, a carrier, vertical knives and devices for removably securing the carrier to the gage-plate.

3. In a potato-slicer, a bracket-frame having lateral flanges, lateral walls, a rear wall and an end brace, the said frame provided with projections, in combination with a cutter-plate, a cutter-blade, a strip extending across the cutter-plate for fastening the cutter-blade to the cutter-plate and having stops adapted to abut against the said projections when the cutter-plate is thrust inwardly upon the bracket-frame, the grater or sheet metal forming a brace for the cutter-plate on the under side thereof extending from side to side thereof, said cutter-plate provided with rearwardly-projecting walls, a brace connecting the inner ends of said walls, a gage-plate, a carrier, removably secured between the said rearwardly-projecting walls, the vertical knives and means for longitudinally and vertically adjusting the gage-plate between the projecting walls.

In testimony whereof I have signed my name to this specification in the presence of two subscribing witnesses.

LAWRENCE L. STEVENS.

Witnesses:
   W. J. BRYANT,
   C. BARTLETT.